US011499773B2

(12) United States Patent
Maeng

(10) Patent No.: US 11,499,773 B2
(45) Date of Patent: Nov. 15, 2022

(54) REFRIGERATOR AND METHOD FOR MANAGING ARTICLES IN REFRIGERATOR

(71) Applicant: LG ELECTRONICS INC., Seoul (KR)

(72) Inventor: Jichan Maeng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 596 days.

(21) Appl. No.: 16/488,191

(22) PCT Filed: Mar. 29, 2019

(86) PCT No.: PCT/KR2019/003744
§ 371 (c)(1),
(2) Date: Aug. 22, 2019

(87) PCT Pub. No.: WO2019/125094
PCT Pub. Date: Jun. 27, 2019

(65) Prior Publication Data
US 2020/0033052 A1 Jan. 30, 2020

(51) Int. Cl.
*F25D 29/00* (2006.01)
*G06N 20/00* (2019.01)
(52) U.S. Cl.
CPC ............. *F25D 29/00* (2013.01); *G06N 20/00* (2019.01); *F25D 2500/06* (2013.01)
(58) Field of Classification Search
CPC ..... F25D 2500/06; F25D 29/00; G06N 20/00; G06Q 10/087
See application file for complete search history.

(56) References Cited

U.S. PATENT DOCUMENTS 10,438,164 B1 * 10/2019 Xiong ...................... H04N 7/18
2008/0205764 A1 * 8/2008 Iwai ........................ G06V 10/46
382/190

(Continued)

FOREIGN PATENT DOCUMENTS

JP 2006338059 12/2006
JP 2007046834 2/2007

(Continued)

OTHER PUBLICATIONS

PCT International Application No. PCT/KR2019/003744, Notification of Transmittal of the International Search Report and the Written Opinion of the International Searching Authority, or Declaration dated Dec. 26, 2019, 9 pages.

*Primary Examiner* — Henry T Crenshaw
(74) *Attorney, Agent, or Firm* — Lee Hong Degerman Kang & Waimey

(57) ABSTRACT

A refrigerator according to the present invention comprises: a storage chamber for storing articles; a camera for photographing the inner space of the storage chamber; a control part which visually recognizes a first article image captured by the camera so as to acquire article information corresponding to the first article image; a memory for storing the acquired article information so as to generate an article image history; and a display electrically connected to the control part. Further, the control part may: acquire, through the camera, a second article image in which an article is partially hidden by any other article; detect, from the second article image, a partial article image of the article partially hidden by the other article; and identify an article matching the partial article image on the basis of the article image history. Further, the control part may perform control such that the corresponding partial article image is displayed on the display in association with the article information iden- (Continued)

tified from the article image history. The present invention provides a refrigerator to which AI (Artificial Intelligence) is applied.

13 Claims, 11 Drawing Sheets

(56) References Cited

U.S. PATENT DOCUMENTS

| | | | | |
|---|---|---|---|---|
| 2013/0076488 A1* | 3/2013 | Oh | ............................ | F25D 29/00 |
| | | | | 340/6.1 |
| 2018/0335252 A1* | 11/2018 | Oh | ............................ | G06V 20/52 |
| 2020/0005225 A1* | 1/2020 | Chaubard | ............... | G06V 10/40 |

FOREIGN PATENT DOCUMENTS

| | | |
|---|---|---|
| JP | 2010121784 | 6/2010 |
| KR | 1020120117464 | 10/2012 |
| WO | 2014168265 | 10/2014 |

* cited by examiner

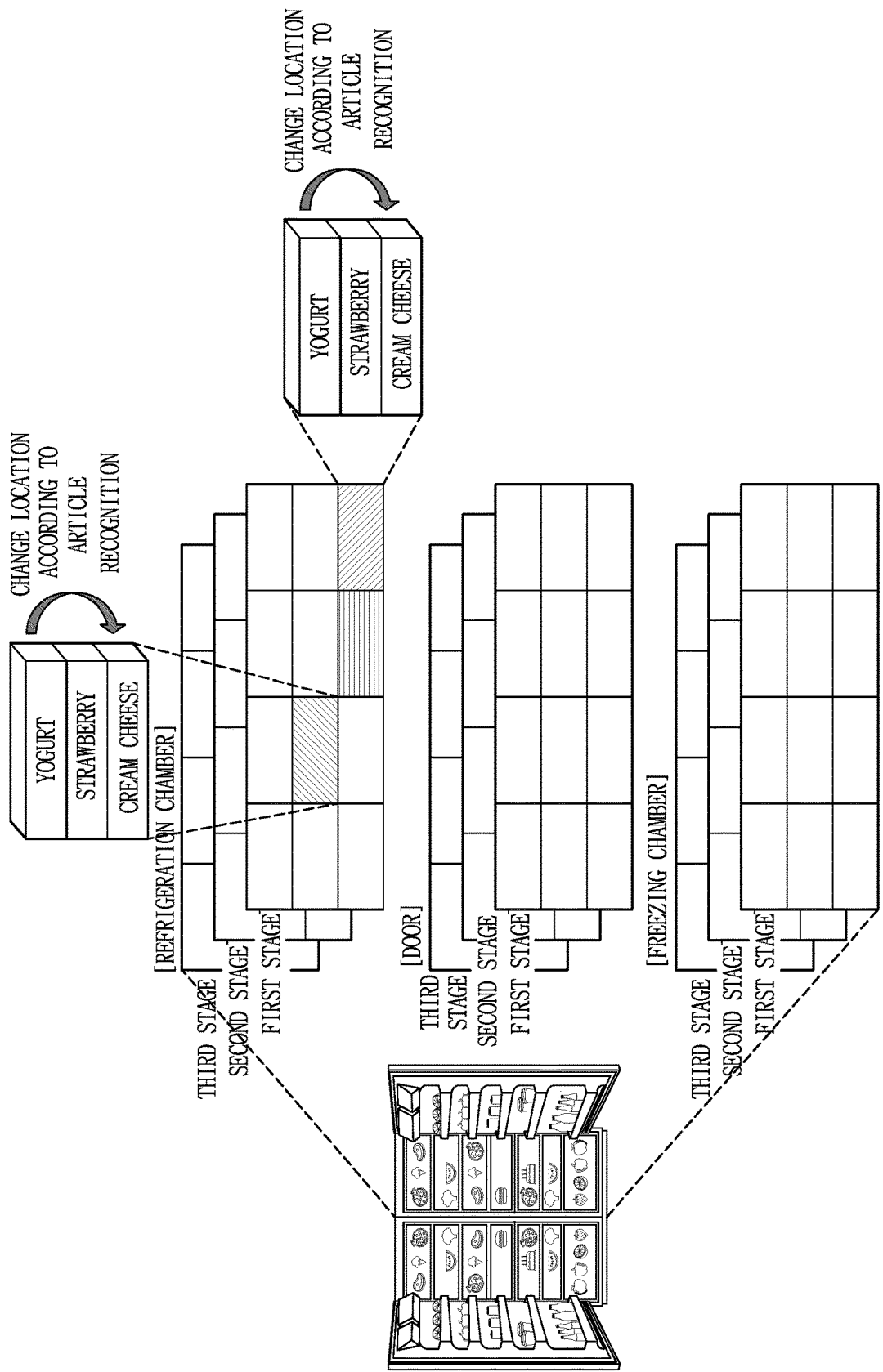

FIG. 5C
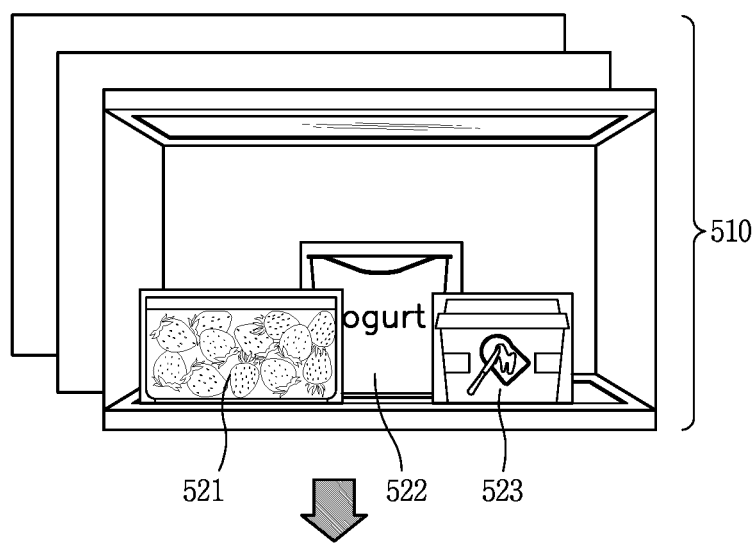
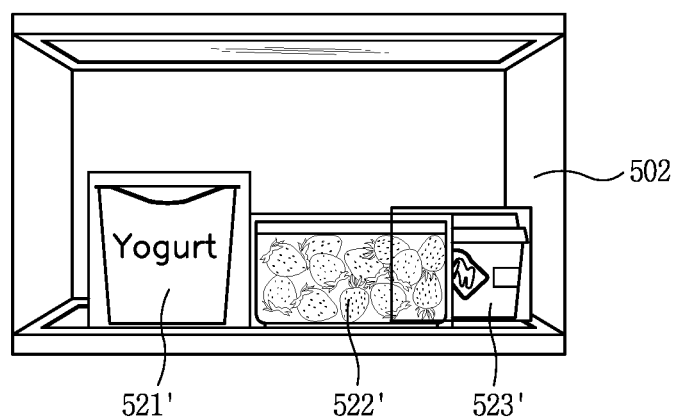

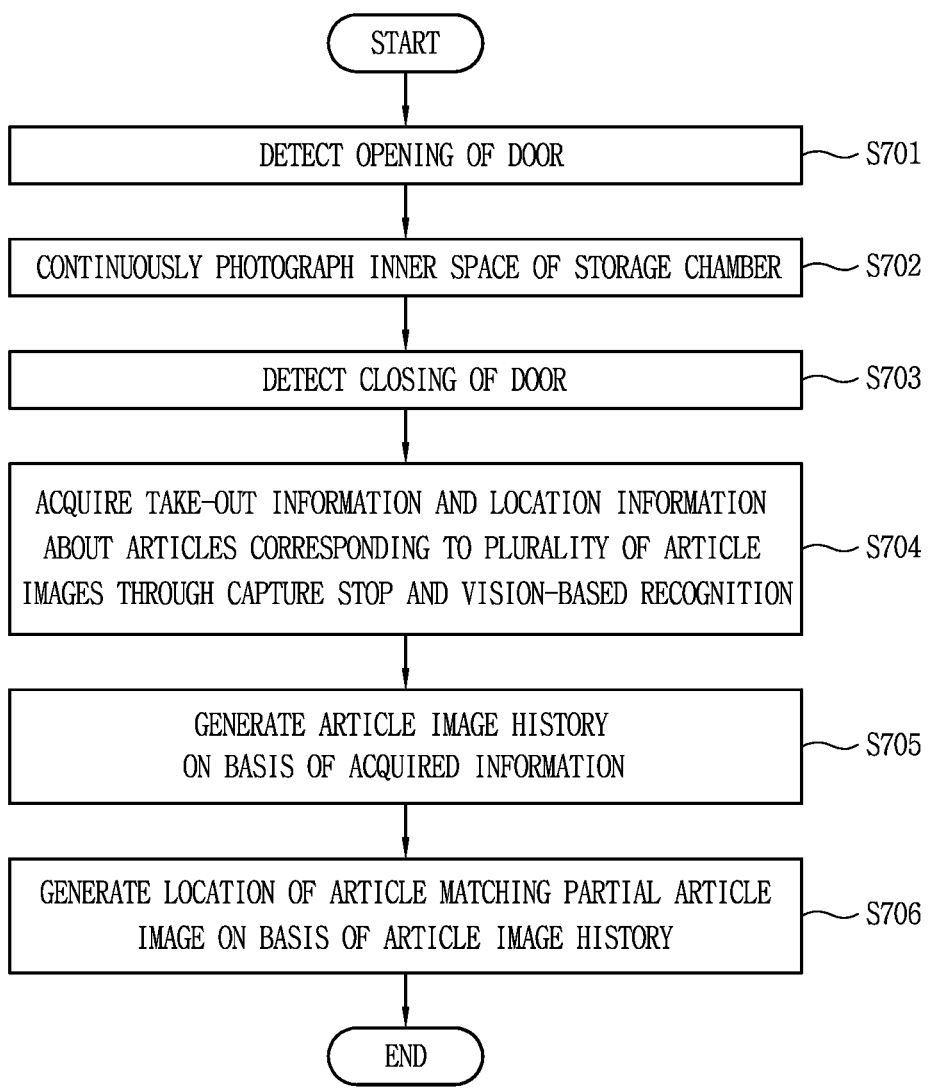

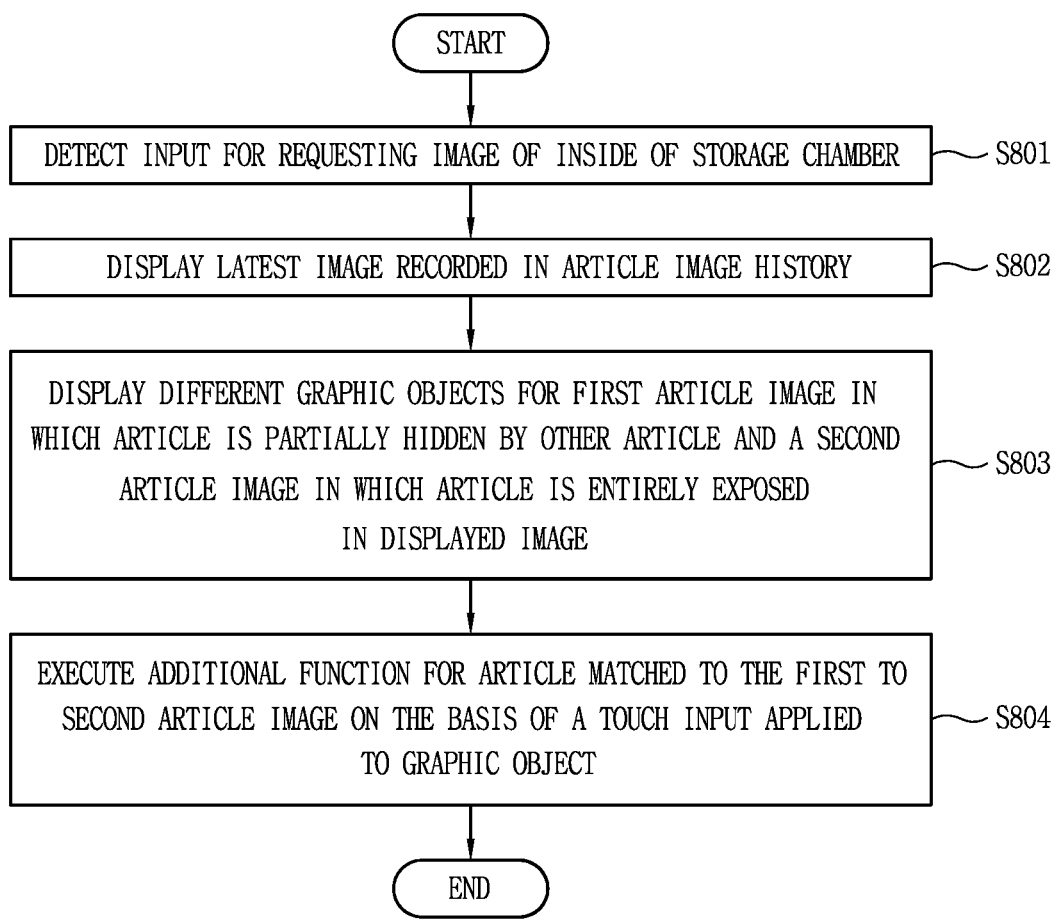

REFRIGERATOR AND METHOD FOR MANAGING ARTICLES IN REFRIGERATOR

CROSS-REFERENCE TO RELATED APPLICATIONS

This application is the National Stage filing under 35 U.S.C. 371 of International Application No. PCT/KR2019/003744, filed on Mar. 29, 2019, the contents of which are hereby incorporated by reference herein in its entirety.

TECHNICAL FIELD

The present invention relates to a refrigerator and a method for managing articles in the refrigerator.

BACKGROUND ART

A refrigerator is an apparatus for discharging cold air generated by a freezing cycle composed of a compressor, a condenser, an expansion valve, an evaporator, etc. to lower the temperature in the refrigerator so that foods or the like may be refrigerated or frozen.

In general, the door of the refrigerator is fabricated opaque and coupled to the main body to open and close the storage chamber of the main body. The door may be opened and closed by a user to approach a refrigerating chamber or a freezing chamber. Before opening the door, generally, the user cannot figure out the kinds and locations of foods stored in the refrigerator.

When the door of a refrigerator is made opaque, a user cannot check foods stored in the inside of the refrigerator without opening the door of the refrigerator. In order to overcome such an inconvenience, there is an example in which a refrigerator is implemented to have a door partially changed to be transparent so that foods stored in the inside of the refrigerator can be checked when a predetermined input is received.

However, even in this case, it is difficult to check all foods stored in the refrigerator including foods stored in the back of or rearward in a refrigerator or foods hidden by other foods. Also, in some cases, it may be difficult to intuitively recognize even foods stored in the front of a refrigerator using only images.

DISCLOSURE

Technical Problem

One object of the present invention is to provide a refrigerator capable of accurately ascertaining an article stored in a storage chamber using an image without opening the refrigerator, and a method of managing articles in the refrigerator.

Also, another object of the present invention is to provide a refrigerator capable of receiving related information using an image even when many articles are stored in a storage chamber and thus an article located in the back of the storage chamber is hidden by another article, and a method of managing articles in the refrigerator. That is, the present invention is directed to providing a refrigerator capable of receiving related information without the location of a stored article, and a method of managing articles in the refrigerator.

Also, still another object of the present invention is to provide a refrigerator capable of quickly ascertaining a put-in/take-out history of an article stored in a storage chamber and a change history of a storage location, and a method of managing articles in the refrigerator.

Also, yet still another object of the present invention is to provide a refrigerator capable of performing an additional function for a specific article using images of articles stored in the storage chamber without opening a refrigerator, and a method of managing articles in the refrigerator.

Technical Solution

A refrigerator according to an embodiment of the present invention includes a storage chamber configured to store articles; a camera configured to capture an image of the inside of the storage chamber; a control unit configured to visually recognize a first article image captured by the camera to acquire article information corresponding to the first article image; a memory configured to store the acquired article information and generate an article image history; and a display electrically connected to the control unit. Also, the refrigerator is characterized in that the control unit acquires a second article image in which an article is partially hidden by any other article through the camera, detects a partial article image of the article partially hidden by the other article in the second article image, and ascertains an article matched to the detected partial article image on the basis of the article image history and in that the control unit performs control such that the detected partial article image is displayed on the display in association with article information ascertained through the article image history.

Also, according to an embodiment, the refrigerator is characterized in that the control unit determines an article corresponding to the partial article image and information about the article by using the article image history and a model learned according to an artificial intelligence algorithm in response to acquiring the second article image.

Also, according to an embodiment, the refrigerator is characterized in that the control unit detects the latest article image stored in the article image history and displays the detected article image on the display when a request for an image of a stored article is input, a first type of article information acquired by visually recognizing the first article image and a second type of article information matched to the partial article image included in the second article image are visually distinguished from each other in the displayed article image, and each of the first type of article information and the second type of article information includes an article name and expiration date information.

Also, according to an embodiment, the refrigerator further includes a communication unit configured to communicate with an artificial intelligence server and is characterized in that by means of the communication unit, the control unit transmits the first article image to the artificial intelligence server, receives article information discovered by visually recognizing the first article image from the artificial intelligence server, and links the received article information to each article image of the first article image to generate the article image history.

Also, according to an embodiment, the refrigerator is characterized in that the article matched to the partial article image is determined by comparing the article to each article image stored in the article image history and in that article information matched to the partial article image is acquired by detecting article information linked to an article image selected based on a result of the comparison in the article image history.

Also, according to an embodiment, the refrigerator is characterized in that the control unit acquires a third article image obtained by photographing the inside of the storage chamber through the camera and compares the article information stored in the article image history to the third article image to determine an article taken out of the storage chamber and a location of the article taken out of the storage chamber and in that the display displays a graphic image indicating the determined location of the article taken out of the storage chamber in association with the third article image.

Also, according to an embodiment, the refrigerator is characterized in that the control unit checks a change in location of an article corresponding to each article image of the second article image on the basis of the article image history and changes an order in which a piece of article information corresponding to each article is arranged and stored on the basis of a result of the check.

Also, according to an embodiment, the refrigerator is characterized in that the control unit displays the second article image on the display and calculates an article size matched to the partial article image on the basis of the article image history and in that in the displayed second partial image, article information matched to the partial article image is displayed in a pop-up window output adjacent to the partial article image, and a graphic object indicating the calculated article size is displayed near the partial article image to overlap with at least a portion of another article image.

Also, according to an embodiment, the refrigerator is characterized in that when a rear article display request corresponding to the partial article image is received, the remaining part image of the article matched to the partial article image extracted on the basis of the article image history is inserted into the graphic object, and the other article image hiding a corresponding rear article in the second article image is displayed in a translucent form.

Also, according to an embodiment, the refrigerator is characterized in that when a touch is applied to the displayed graphic object, the control unit executes a first function associated with additional information about an article corresponding to a touched region and in that when a touch is applied to the displayed pop-up window, the control unit executes a second function associated with a purchase of an article according to a touched region.

Also, the refrigerator further includes a door opening/closing detection sensor configured to detect opening or closing of a refrigerator door and is characterized in that when the opening of the refrigerator door is detected through the door opening/closing detection sensor, the control unit outputs a driving signal to the camera to performs control such that capturing is continuously executed and in that when the closing of the refrigerator door is detected through the door opening/closing detection sensor, the control unit outputs a driving stop signal to the camera, visually recognizes a plurality of continuously captured article images, acquires take-out information and location information about a corresponding article, and generates the article image history on the basis of the acquired information.

Also, the refrigerator is characterized in that the last captured article image among the plurality of continuously captured article images is stored in the article image history.

Also, a method of managing articles in a refrigerator according to an embodiment of the present invention includes photographing the inside of a storage chamber of the refrigerator to acquire a first article image; acquiring article information corresponding to the first article image by visually recognizing the first article image; storing the acquired article information to generate an article image history; photographing the inside of the storage chamber of the refrigerator to acquire a second article image in which an article is partially hidden by another article; detecting a partial article image of the article partially hidden by the other article in the second article image; ascertaining an article matched to the detected partial article image on the basis of the article image history, and displaying the detected partial article image on a display in association with article information ascertained through the article image history.

Advantageous Effect

According to an embodiment of the present invention, it is possible to acquire article information about a stored article by visually recognizing an article image acquired through a camera provided in a storage chamber and also to quickly check the identity of an article located in the back of the storage chamber by managing the acquired article information using an article image history. Thus, it is possible to recognize and display an article matched to a partial article image of the article located in the back of the storage chamber and hidden by another article and article information about the article on the basis of the article image history. Furthermore, by ascertaining a put-in/take-out history of an article stored in or taken out of the storage chamber and a change history of a storage location using images, it is possible to quickly, visually, and easily ascertain a put-in/take-out rank or a storage location of the article.

BRIEF DESCRIPTION OF THE DRAWINGS

FIGS. 5A, 5B, and 5C are diagrams illustrating a data storage scheme for refrigerator article management and a method of recognizing the location of an article according to an embodiment of the present invention.

FIGS. 7 and 8 are flowcharts illustrating a method of managing articles in a refrigerator according to another embodiment of the present invention.

MODES FOR CARRYING OUT THE PREFERRED EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
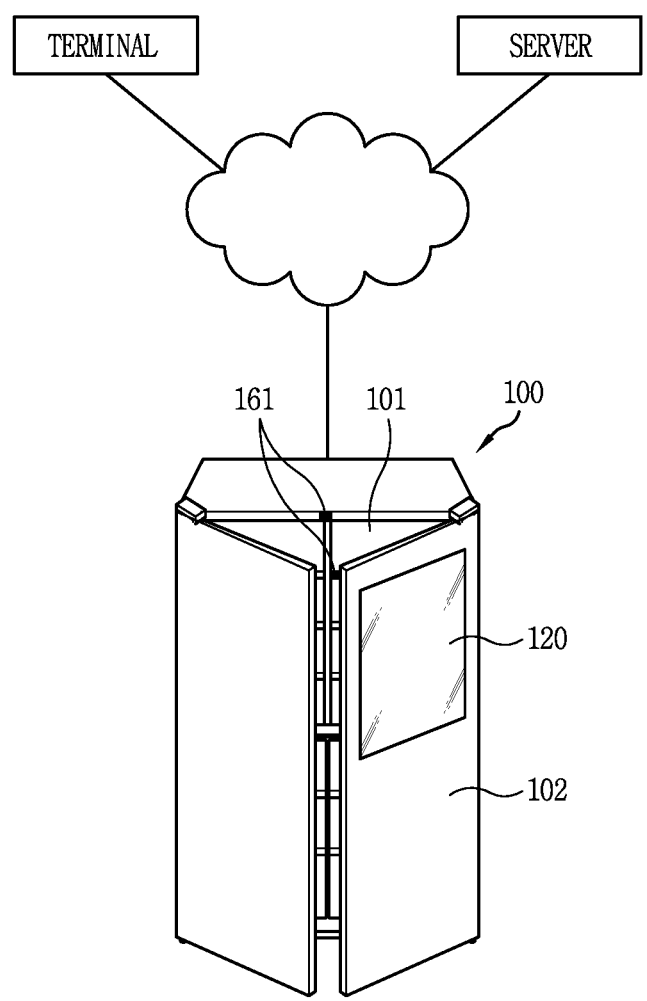
FIG. 1 is a schematic diagram illustrating that a refrigerator communicates with an external device such as a server and a terminal to interact with each other according to an embodiment of the present invention.

FIG. 1 is a schematic diagram illustrating that a refrigerator communicates with an external device such as a server and a terminal to interact with each other according to an embodiment of the present invention.

Referring to FIG. 1, a refrigerator 100 according to the present invention may communicate with an external terminal and/or an external server over a network or the like. A display 120 for outputting information may be provided at least one or both sides of a door 102 of the main body of the refrigerator according to the present invention.

A touchpad is built in the display 120, and the display 120 may receive a touch input from a user. A process provided in the refrigerator 100 and electrically connected to the display 120 may output a control command corresponding to a touch input received through the display 120. Then, the display 120 displays information corresponding to a control command delivered through the processor.

A storage chamber 101 for storing foods or the like is provided inside the main body of the refrigerator. The storage chamber 101 may be divided into a refrigeration chamber and a freezing chamber, each of which may include a plurality of storage rooms. Also, the plurality of storage rooms may be formed as independent spaces through partitioning by barriers or the like.

One or more cameras 161 for capturing an image of the inside of the storage chamber 101 may be provided inside the storage chamber 101.

As shown in FIG. 1, the cameras 161 may be provided at a first point where both doors meet to capture an image of a user approaching the refrigerator or the like. Also, as shown in FIG. 1, the one or more cameras 161 may be provided in a plurality of storage rooms in the refrigerator. In this case, a flash or the like may be additionally disposed at a position adjacent to the camera. For example, the flash provides light to the inside of the storage chamber when the camera 161 captures an image of a product (or article) being input into or output from the refrigerator or a product being stored.

Images of products (or articles) stored in the storage chamber, which are captured through the camera 161, may be displayed on the display 120.

Also, the processor (not shown) of the refrigerator may deliver the captured article image (or product image) or the displayed article image to the external server or the terminal through a communication module (not shown).

In this case, the external server or the terminal in communication with the refrigerator may visually recognize the product image using an artificial intelligence module. The artificial intelligence module processes information based on artificial intelligence technology and may include one or more modules for performing at least one of information learning, information inference, information perception, and natural language processing.

An algorithm using such a machine learning technology may be a statistics-based algorithm and may include Decision Tree, which uses a tree structure form as a prediction model; Neural Network, which mimics the structure and function of a biological neural network; Genetic Programming, which is based on biological evolutionary algorithms; Clustering, which distributes an observed example to subsets called clusters; and Monte Carlo Method, which probabilistically calculates a function value through arbitrarily extracted random numbers.

As a field for a machine learning technology, a deep learning technology is a technology of performing at least one of learning, determination, and processing on information using an artificial neural network algorithm. An artificial neural network may have a structure for performing connection between layers and transferring data between layers. A deep learning technology can learn a massive amount of information through an artificial neural network using a graphic processing unit (GPU) optimized for parallel computing.

In particular, convolutional neural network (CNN) technology is a deep learning technology for visual recognition. This is a technology of applying various image understanding technologies based on deep learning, performing classification, searching, and object detection on images, and connecting the images to analysis information (or functions).

For example, as an application function using the CNN technology, a translation function is provided by analyzing text included in an image captured by a camera, or a shopping function is provided so that a product included in an image captured by a camera may be purchased online. As another example, a phone connection function is performed when a phone contact is captured through a camera, and a customized styling provision function is provided when a user is captured. Furthermore, a function of virtually creating a face at various angles by converting a face image included in an image into a 3D model through Face Recognition API or the like may be performed.

Meanwhile, when a specific operation is executed, an artificial intelligence module may analyze history information indicating the execution of the specific operation through the machine learning technology and may update previously learned information on the basis of the analysis information. Thus, the artificial intelligence module may improve information prediction accuracy.

In this specification, it may be understood that the artificial intelligence module is the same element as a processor or a control unit of the external server or the external terminal (or the refrigerator).

As another example, an artificial intelligence module (not shown) may be independently provided in the refrigerator. In this case, the visual recognition may be performed in the refrigerator without having to transmit a captured article image to the external server or terminal like FIG. 1.

Figure 2:
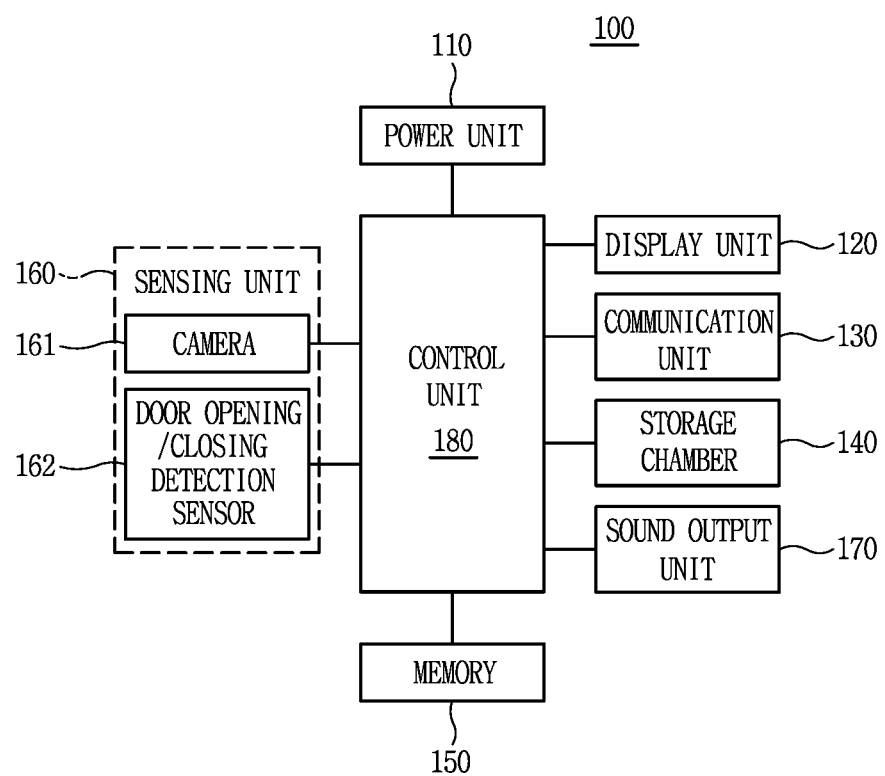
FIG. 2 is an example block diagram illustrating a configuration of a refrigerator according to an embodiment of the present invention.

FIG. 2 is an example block diagram illustrating a configuration of the refrigerator according to an embodiment of the present invention.

Referring to FIG. 2, the refrigerator 100 may include a control unit (hereinafter used interchangeably with a processor) 180 and may include a sensing unit 160, a display unit 120, a communication unit 130, a memory 150, a power unit 110, and a sound output unit 170 which are electrically connected to the control unit 180. Also, as described above, the refrigerator 100 may include a storage chamber 140 formed to store products.

Meanwhile, the elements shown in FIG. 2 are not essential for implementing the refrigerator 100, so that the refrigerator 100 described herein may have more or fewer elements than the elements listed above.

In more detail, under control of the control unit 180, the power unit 110 among the above elements may receive power from the outside and supply the power to each element included in the refrigerator 100.

Although not shown, a door provided on the front surface of the refrigerator may be formed to selectively open or close the storage chamber 140 provided inside the refrigerator 100, and a plurality of such doors may be formed.

At least one sensor may be provided in the door and formed to detect a user input. As an example, the door may form a mutual layer structure together with a touch sensor to detect a user's touch input applied to the door. Alternatively, the door may have a sound sensor to sense a user's knock input, which indicates knocking on the door.

Also, although not shown, the storage chamber 140 may include at least one light. The light may be provided in a region of each of a plurality of storage rooms of the storage chamber and may be formed to emit light depending on whether the door is opened.

The storage chamber 140 may include a storage chamber for storing foods and a compressor, a condenser, an expansion valve, an evaporator, and the like which are formed in the storage chamber to discharge cold air according to a predetermined freezing cycle. The storage chamber 140 may freeze or refrigerate the foods or the like stored in the storage chamber by lowering the temperature in the refrigerator 100 by the discharged cold air.

The display unit 120 may receive a user input and may display information corresponding to the user input, for example, a product image. The display unit 120 may include a display panel (not shown) for displaying a product image. As the display panel, a cathode ray tube (CRT) display panel, a liquid crystal display (LCD) panel, a light emitting diode (LED) panel, an organic light emitting diode (OLED) panel, a plasma display panel (PDP), a field emission display (FED) panel, or the like may be employed.

Also, the display unit 120 may receive a user's touch input, generate an electrical signal corresponding to the received touch input, and provide the generated electrical signal to a controller of the display unit. The display unit 120 may be installed on one or both sides with respect to the door, as shown in FIG. 1, for user convenience.

Meanwhile, the sensing unit 160 may include one or more sensors for sensing information regarding the inside of the refrigerator 100 and an ambient environment surrounding the refrigerator 100. For example, the sensing unit 160 may have an environmental sensor for detecting the temperature, humidity, or the like of the storage chamber 140 of the refrigerator 100 or a human body detection sensor for detecting a user near the refrigerator.

Also, the sensing unit 160 may include a door opening/closing detection sensor 162 for detecting the opening or closing of the door and a camera 161 for capturing an image of the inside of the storage chamber. The door opening/closing detection sensor 162 and the camera 161 have been described above, and thus a description thereof will be omitted.

Also, the sensing unit 160 may be a sensor associated with various functions of the refrigerator 100 and may include a sensor associated with an automatic door function. For example, the sensing unit 160 may include a proximity sensor capable of detecting a user proximate to the refrigerator 100. In this case, the proximity sensor may be formed to detect the body of the proximate user, Also, the control unit may control at least one of the doors of the refrigerator 100 to be opened according to the detection result by the proximity sensor (an automatic door function).

Also, the memory 150 stores data for supporting various functions of the refrigerator 100. The memory 150 may store multiple application programs or applications being driven in the refrigerator 100 and store data and commands for operation of the refrigerator 100.

At least some of the application programs may be downloaded from an external server through wireless communication. Also, at least some of the application programs may reside in the refrigerator 100 at the time of shipment to perform basic functions (e.g., a storage region-specific temperature management function) of the refrigerator 100.

Also, information regarding a product image history according to the present invention is stored in the memory 150. Also, one or more product images recorded in the product image history are stored in the memory 150.

The communication unit 130 may include one or more modules for enabling the processor of the refrigerator to communicate with an external server and/or terminal in a wireless manner. For example, the communication unit 130 may include a Wi-Fi module, a Zigbee module, and the like for accessing a local area network.

The sound output unit 170 may output a sound signal related to a function (e.g., a door opened, a product purchased, etc.) performed by the refrigerator 100. The sound output unit 170 may include a receiver, a speaker, a buzzer, and the like. For example, the sound output unit 170 may convert an electrical signal delivered from the control unit 180 into a sound signal and output the sound signal through the speaker.

The control unit 180 controls the overall operation of the refrigerator 100. The control unit 180 may provide or process information or functions appropriate to a user by processing signals, data, information, and the like which are input or output through the above elements or by driving the application programs stored in the memory 150.

Also, the control unit 180 may control at least some of the elements described with reference to FIG. 2 in order to drive the application programs stored in the memory 150. Furthermore, in order to drive the application program, the control unit 180 may operate at least two of the elements included in the refrigerator 100 in combination.

Also, the control unit 180 may control each of the connected elements. In particular, the control unit 180 may control operation of the camera 161 to capture an image of the inside of the storage chamber 140. Also, the control unit 180 may control operation of the communication unit 130 such that the product image acquired through the camera 161 is transmitted to the external server or terminal to perform visual recognition using the CNN deep learning technology or the like. Also, the control unit 180 performs control such that the captured product image and product information acquired through the visual recognition of the product image are stored to create a product image history. Also, the control unit 180 controls operation of the display 120 to perform displaying in association with product information confirmed based on the captured product image and the product image history.

The term "product" or "article" used herein may include industrial products manufactured and traded by people or machines, products produced or hunted by users, and the like. Such a "product" may be stored in the refrigerator while being stored in a separate container.

A refrigerator product management method according to an embodiment of the present invention will be described in detail below with reference to FIG. 3.

Figure 3:
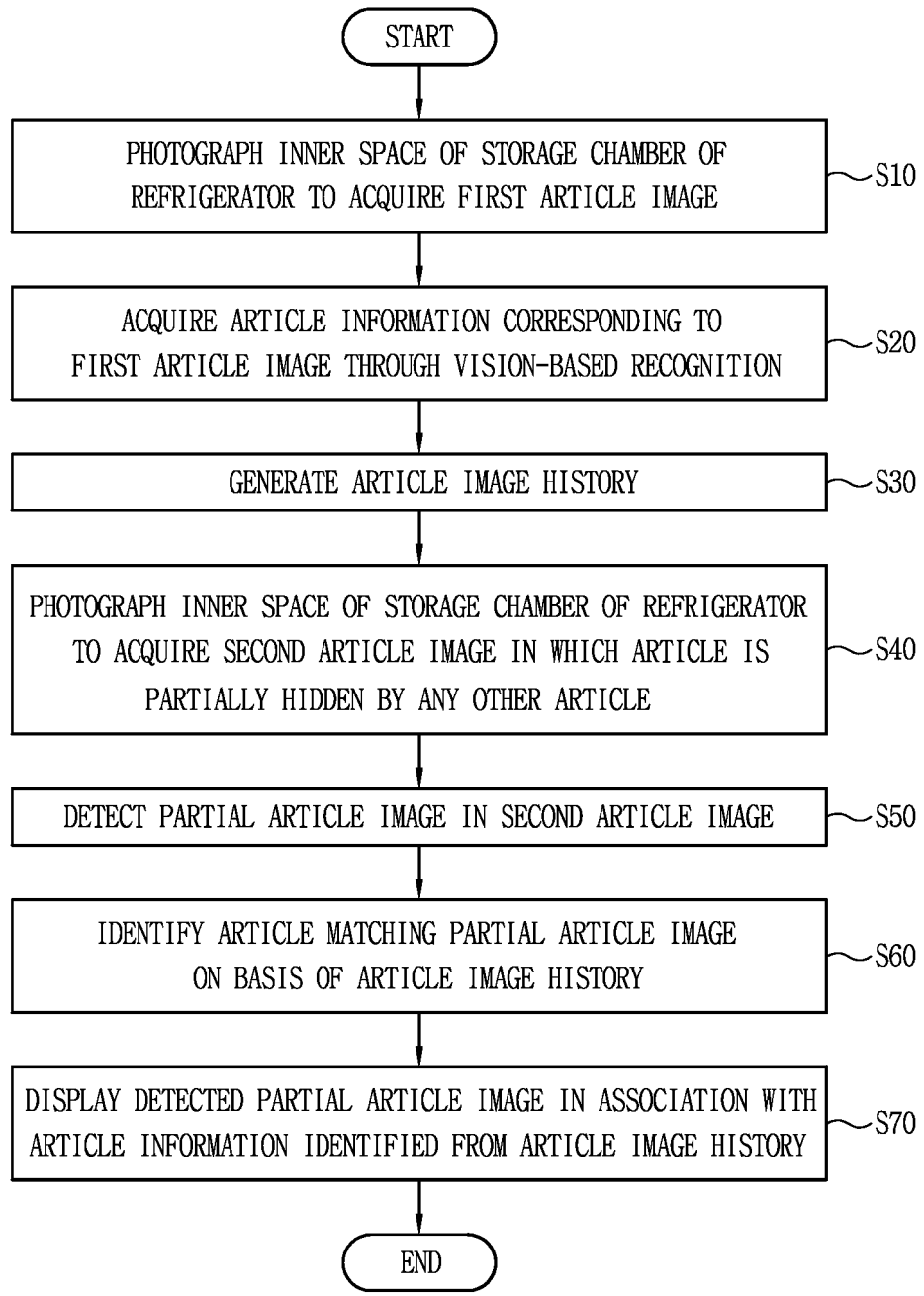
FIG. 3 is a representative flowchart illustrating a method of managing articles in a refrigerator according to an embodiment of the present invention.

Referring to FIG. 3, first, a step of capturing an image of the inside of the storage chamber of the refrigerator through a camera provided inside of the storage chamber of the refrigerator to acquire a first article image is performed (S10).

The camera may be placed at one location or two or more different locations among a front surface, a rear surface, a left surface, a right surface, and an upper surface of each storage compartment of the storage chamber. Also, the first article image may be a still image generated according to a single capture signal or a video generated through real-time recording.

A camera driving signal for acquiring the first article image may be automatically generated when a user input is applied or when the opening of the refrigerator door is detected.

When the first article image is acquired through the camera in the refrigerator, the acquired first article image is visually recognized to acquire corresponding article information (S20). In order to visually recognize the first article image, the first article image acquired through the step S10 may be transmitted to an artificial intelligence server interworking with the refrigerator.

In detail, the processor of the refrigerator may transmit the first article image to the artificial intelligence server through the communication unit 130 and may receive article information discovered by visually recognizing the first article image from the artificial intelligence server.

The artificial intelligence server may be aware of a real article matched to one or more article images included in the first article image, for example, through CNN deep learning technology. Also, when text and an expiration date are displayed, the artificial intelligence server may provide a result of analyzing the text in association with article information about a corresponding article.

The article information includes objective information, such as a type (category), a name, an expiration date, a purchase amount, and a storage period, of an article. Also, the article information may include user-customized information such as remaining amount information, a purchase frequency, a use frequency (a put-in/take-out frequency), a purchase time, a purchase place, payment means, and other user-entered information.

Also, the article information may additionally include information obtained by analyzing information acquired from an external artificial intelligence server or information processed in association with the information stored in the refrigerator.

As another example, the first article image may be visually recognized in the refrigerator itself. In this case, the processor of the refrigerator may perform functions similar to those of the above-described artificial intelligence server.

The processor generates an article image history on the basis of the acquired article information (S30).

In detail, the processor of the refrigerator generates the article image history by linking the article information received through the communication unit 130 to each article image of the first article image. For example, when first-one article image, first-two article image, and first-three article image are included in the first article image, the processor links first-one article information to the first-one article image, links first-two article information to the first-two article image, and links first-three article information to the first-three article image.

The article image history is generated to include the articles included in the first article image and article information about each article, and the first article image itself or a representative image (e.g., a still image) of the first article image is also stored in the memory of the refrigerator.

For example, when the first article image is composed of a plurality of still images, the representative image may be the last captured still image. Also, when the first article image is composed of continuous moving images, the representative image may be a capture image of a specific section.

After the article image history is generated in this way, the inside of the storage chamber of the refrigerator is captured through the camera to acquire a second article image in which an article is partially hidden by any other article.

Here, an article being hidden by any other article means that when the other article is additionally stored in front of the article in the refrigerator, a portion of the article is hidden by the other article and only the remaining portion is exposed. Usually, the other article corresponds to an article stored in the back of or rearward in the storage chamber.

A camera driving signal for acquiring the second article image is generated under conditions similar to those of the camera driving signal for acquiring the first article image. In other words, when a predetermined user input is applied or when the opening of the door is detected, the camera driving signal for acquiring the second article image is output.

Meanwhile, the second article image may be generated before or after the first article image is generated. For example, when the second article image in which an article is partially hidden by another article is acquired, a first article image may be acquired again after some articles are taken out of the refrigerator.

Also, even after the first article image is acquired once, a first article image may be additionally acquired. That is, first article images are continuously acquired while no articles are hidden by other articles, and thus a stored image history is continuously updated.

For example, by comparing the first-acquired first article image and the last-acquired first article image, a user frequency (put-in/take-out frequency) history of a specific article may be modified. In this case, the representative image of the first-acquired first article image and the representative image of the last-acquired first article image are cumulatively stored.

When a second article image in which an article is partially hidden by any other article is acquired, a partial article image is detected in the acquired second article image (S50). When a plurality of articles are partially hidden by other articles in the second article image, partial article images are detected for each or all of the articles.

In this case, as a detection condition of the partial article image, the degree of exposure may be required to check the identity of an article matched to the partial article image.

For example, only when the degree of exposure is 25% to 30% or more, the partial article image may be allowed to be detected. However, the present invention is not necessarily limited to the above-described numerical range, and the numerical range may vary depending on the performance of the artificial intelligence server and the type of deep running algorithm used.

Meanwhile, even though the degree of exposure of the partial article image is less than a predetermined numerical range, the partial article image may be allowed to be detected when the identity of the article can be checked by analyzing text (e.g., an article name, a logo, etc.) through visual recognition.

Next, an article matched to the detected partial article image is ascertained on the basis of the stored article image history (S60). In detail, by comparing the detected partial article image and one or more article images stored in the article image history, the identity is checked by searching for an article image matched to the partial article image.

For example, when it is determined, through an image analysis unit or a processor in the refrigerator, that 95% or more of the partial article image is the same as a part of a specific article image of an article image recorded in the article image history, the article matched to the detected partial article image is determined.

According to the present invention, in order to ascertain the article matched to the partial article image, there is no need to transmit the article image to an artificial intelligence server to perform visual recognition. Although not described above, identity check may be quickly performed on another article image included in the second article image, that is, an article image in which an article is not partially hidden by another article by searching the stored article image history.

However, when an article newly put in the refrigerator is included in the second article image, the second article image in which the location of a corresponding article image is marked for visual recognition may be transmitted to the artificial intelligence server.

When the article matched to the partial article image is ascertained, the detected partial article image is displayed through the article image history in association with the ascertained article information (70).

In detail, a second article image in which an article is partially hidden by another article may be displayed to a display unit 120 provided at the door in association with the name, expiration date information, etc. of the article having the ascertained identity in the vicinity of the partial article image.

According to the aforementioned embodiment, a user can be easily and quickly aware of articles stored in a refrigerator through displayed article information even when the articles are stored in the back of or rearward in the refrigerator and thus difficult to identify through images.

Figure 4:
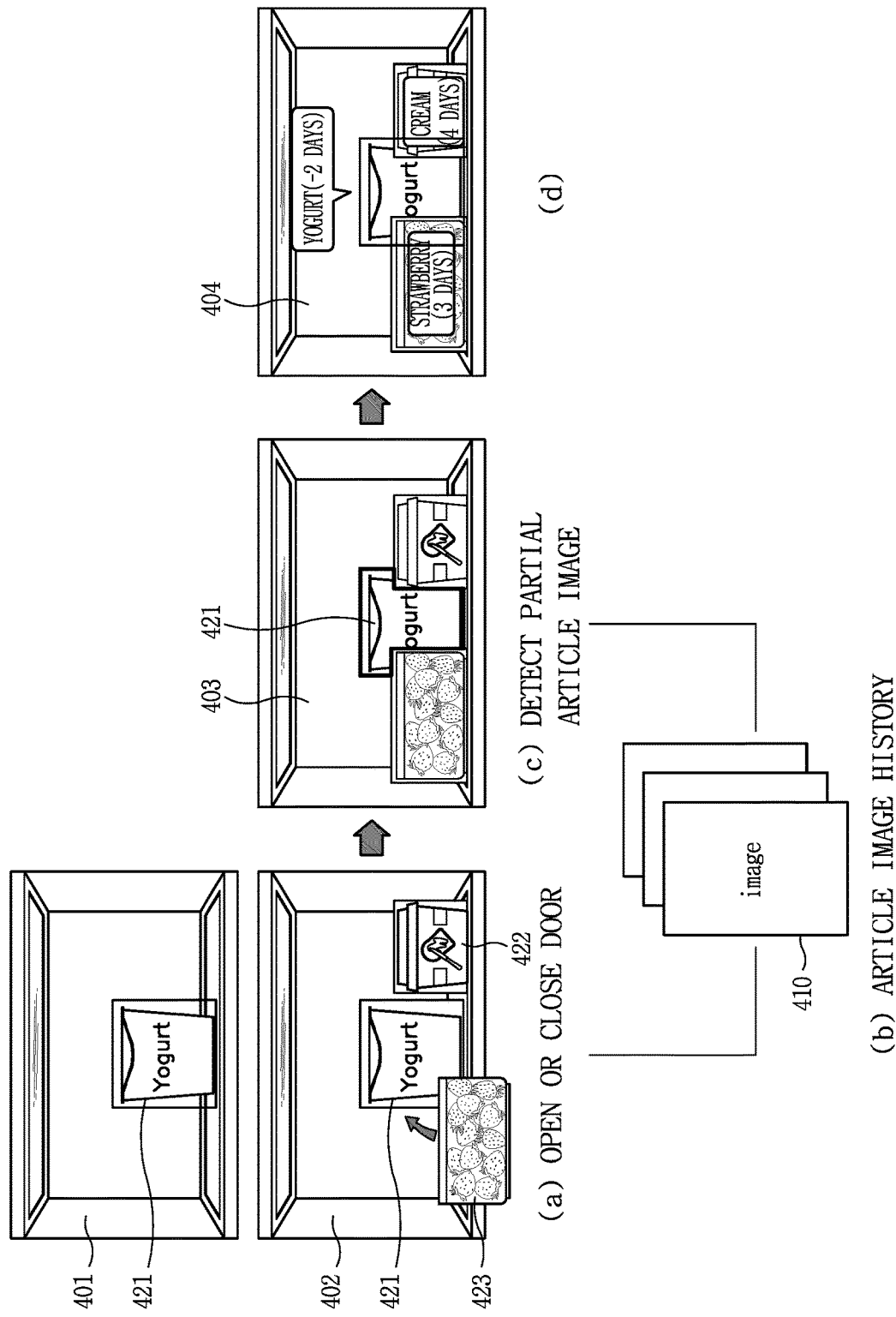
FIG. 4 shows conceptual diagrams illustrating a process of displaying article information about a partial article image of an article partially hidden by another article on the basis of an article image history according to an embodiment of the present invention.

FIG. 4 shows a process of displaying article information about a second article image in which an article is partially hidden by another article on the basis of an article image history according to an embodiment of the present invention.

As shown in FIG. 4A, a first article 421 and a second article 422 sequentially put into a storage chamber are visually recognized through article images 401 and 402 captured while a refrigerator door is being opened or closed.

Article information (e.g., an article name, an expiration date information, and size information) about the visually recognized first article 421 and second article 422 may be cumulatively stored in an article image history 410 along with the last captured article image 402.

Subsequently, when an image of a third article 423 is captured while being additionally put into the storage chamber, an article image 403 in which the first article 421 is partially hidden by the articles 422 and 423 is acquired as shown in FIG. 4C. When the first article 421 is partially hidden, direct image analysis through the article image 403 is difficult.

Thus, a partial article image (Bold frame) of the first article 421 is extracted from the article image 403, and an article matched to the extracted partial article image is ascertained by searching the images recorded in the article image history.

To this end, the processor (or the control unit) of the refrigerator may determine an article corresponding to the partial article image and information about the article by using the stored article image history 410 and a model learned according to an artificial intelligence algorithm together or in sequence in response to acquiring the second article image.

Subsequently, when an article image request is input, the control unit of the refrigerator detects the latest article image stored in the article image history is detected and displayed on the display unit provided at the door.

Here, an article image request refers to a request to view articles stored in a storage chamber of a refrigerator using images without a user opening a refrigerator door. The input of this request is an input to the display unit 120, but may be automatically generated by detecting a user's proximity and a user's grip of a door handle rather than a user's voice command.

In detail, when an article image request is input, the control unit displays a recently captured article image 403, that is, an image in which a portion of the first article 421 is hidden. In this case, article information about each article ascertained from the article image history is displayed in association with the image.

In the displayed article image, a first type of article information acquired by visually recognizing a first article image and a second type of article information matched to a partial article image included in a second article image are visually distinguished from each other. Also, each of the first type of article information and the second type of article information may include article names and storage period information.

In detail, the article information about the partial article image may be provided in a different form from those of an image of the second article 422 and an image of the third article 423. For example, a pop-up window in the form of a speech balloon for displaying an article name (e.g., yogurt) and expiration date information (e.g., two days) may be displayed adjacent to the partial article image. Also, an article name and an expiration date corresponding to each of the image of the second article 422 and the image of the third article 423 may be directly displayed.

A data storage scheme for refrigerator article management and a method of recognizing the location of an article will be described below with reference to FIGS. 5A, 5B, and 5C.

First, FIG. 5A shows the data storage scheme for refrigerator article management. As shown in FIG. 5A, the storage chamber of the refrigerator is divided into a refrigeration chamber, a door, and a freezing chamber, and each of the refrigeration chamber, the door, and the freezing chamber is subdivided into three layers.

Also, mapping based on each of the layers obtained through the subdivision is performed on independent storage spaces in the form of a two-dimensional grid. Data associated with the article information acquired through the visual recognition is stored and managed in each grid cell. When a plurality of articles are stored in one layer, a plurality of pieces of article information may be stacked and stored in the same grid cell. The location of even article information stored in the same grid cell may be continuously changed according to the take-out and then put-in of the article.

When a new article is put into the storage chamber, the article image history is updated by adding an article name, expiration date information, and the like to a grid cell matched into the put-in location.

When any article is taken out of the storage chamber, the article image history is updated by deleting an article name, expiration date information, and the like that have been put into a grid cell matched to the take-output location. However, considering that the article taken out of the storage chamber may be put into the storage chamber again, information regarding the article taken out of the storage chamber may be stored in another storage space or spare cells for a certain period of time.

Figure 5B:
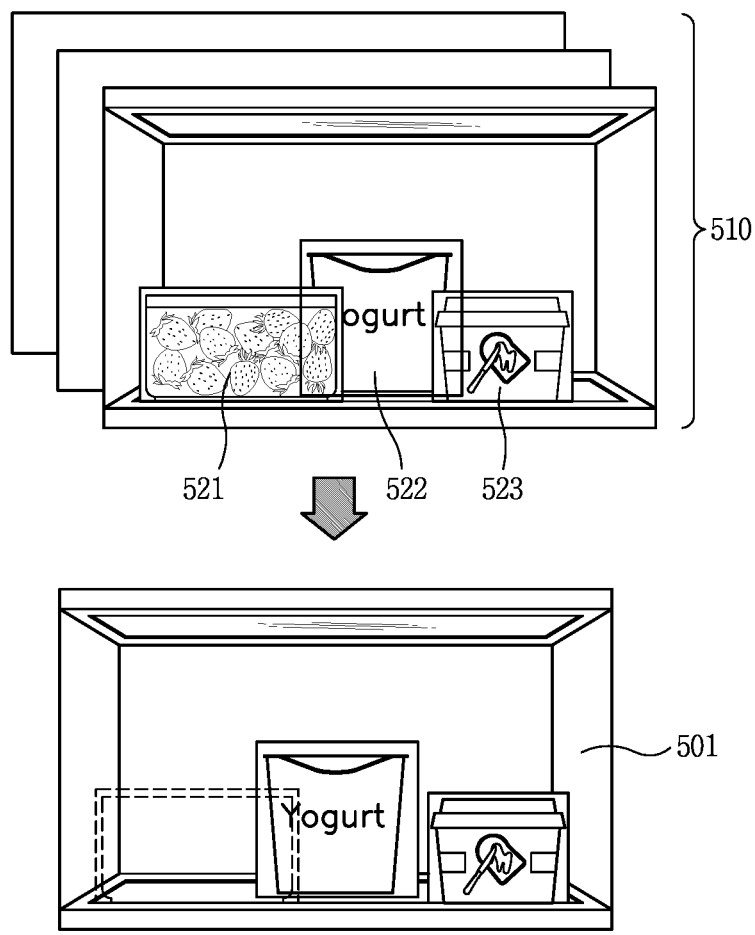

FIG. 5B shows an example in which an article image is used to guide the previous location of the article taken out of the storage chamber. Referring to FIG. 5B, the control unit of the refrigerator according to the present invention may further acquire a third article image obtained by photographing the inside of the storage chamber through the camera provided inside the storage chamber. Here, the third article image refers to an article image corresponding to when one or more articles are taken out of the storage chamber.

The control unit may compare article information stored in an article image history 510 (e.g., the storage location of an article) to the third article image and determines an article taken out of the storage chamber and the location of the article taken out of the storage chamber. By comparing a captured article image 501 to the last recorded image of the article image history 510, the control unit may be aware that an article "a" 522 and an article "b" 523 are left and an article "c" 521 is taken out of the storage chamber.

The control unit may control the display unit 120 to display a graphic image indicating the determined location of the article taken out of the storage chamber in association with the third article image 501. For example, the control unit may match the location and size of the article "c" 521 to the captured article image 501 in the last recorded image of the article image history 510 and display a box image drawn with dotted lines.

In this way, by displaying the location of the article previously taken out of the storage chamber, it is possible for a user to accurately ascertain the previous storage location and store a corresponding article before opening the door and put the article into the storage chamber.

FIG. 5C shows an example in which only the storage locations of articles are changed without articles being taken out of the storage chamber.

The control unit of the refrigerator may check a change in location of an article corresponding to each of the first article image or the second article image on the basis of the article image history and may change the order in which a piece of article information corresponding to each article is arranged on the basis of the check result and then store the article information in the changed order. Thus, as shown in FIG. 5A, the location of even article information stored in the same grid cell may be continuously changed.

As described above, when the storage location of the article is changed, the article information matched to the partial article image may be changed. For example, as shown in FIG. 5C, the article "a" 522 is detected as the partial article image according to the last recorded image of the article image history 510. However, the article "b" 523' is detected as the partial article image according to a new article image 502 changed in location, and the order in which the article information about the article "a" 522' and the article information about the article "c" 521' are arranged and stored is changed.

As described above, according to the present invention, by ascertaining a history of an article stored in or taken out of the storage chamber of the refrigerator and a change history of a storage location using images, it is possible to ascertain put-in/take-out ranks or to quickly, visually, and easily ascertain the storage location of the article.

Figure 6A:
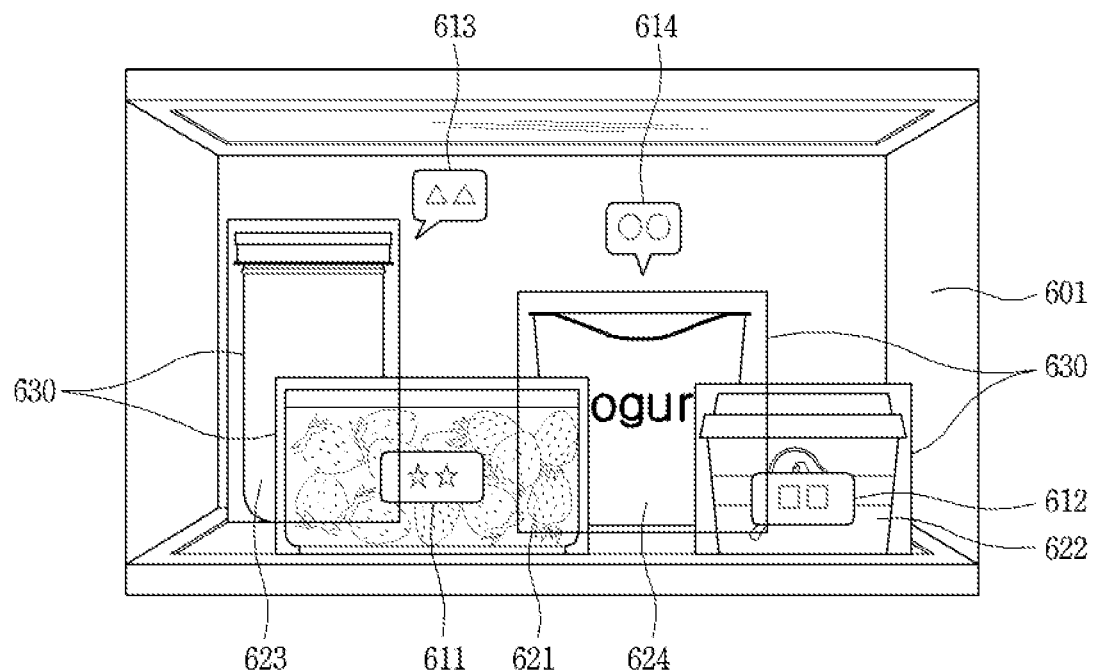
FIGS. 6A, 6B, and 6C are conceptual diagrams illustrating a method of controlling displaying associated with a partial article image of an article partially hidden by another article or executing an additional function according to an embodiment of the present invention.
Figure 6B:
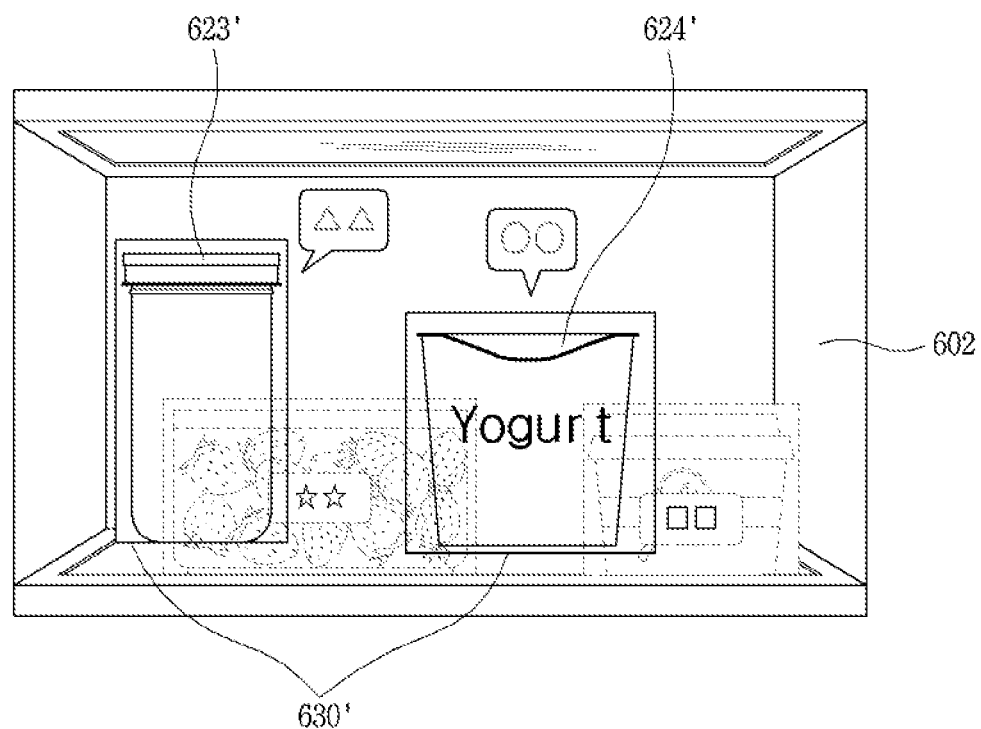
Figure 6C:
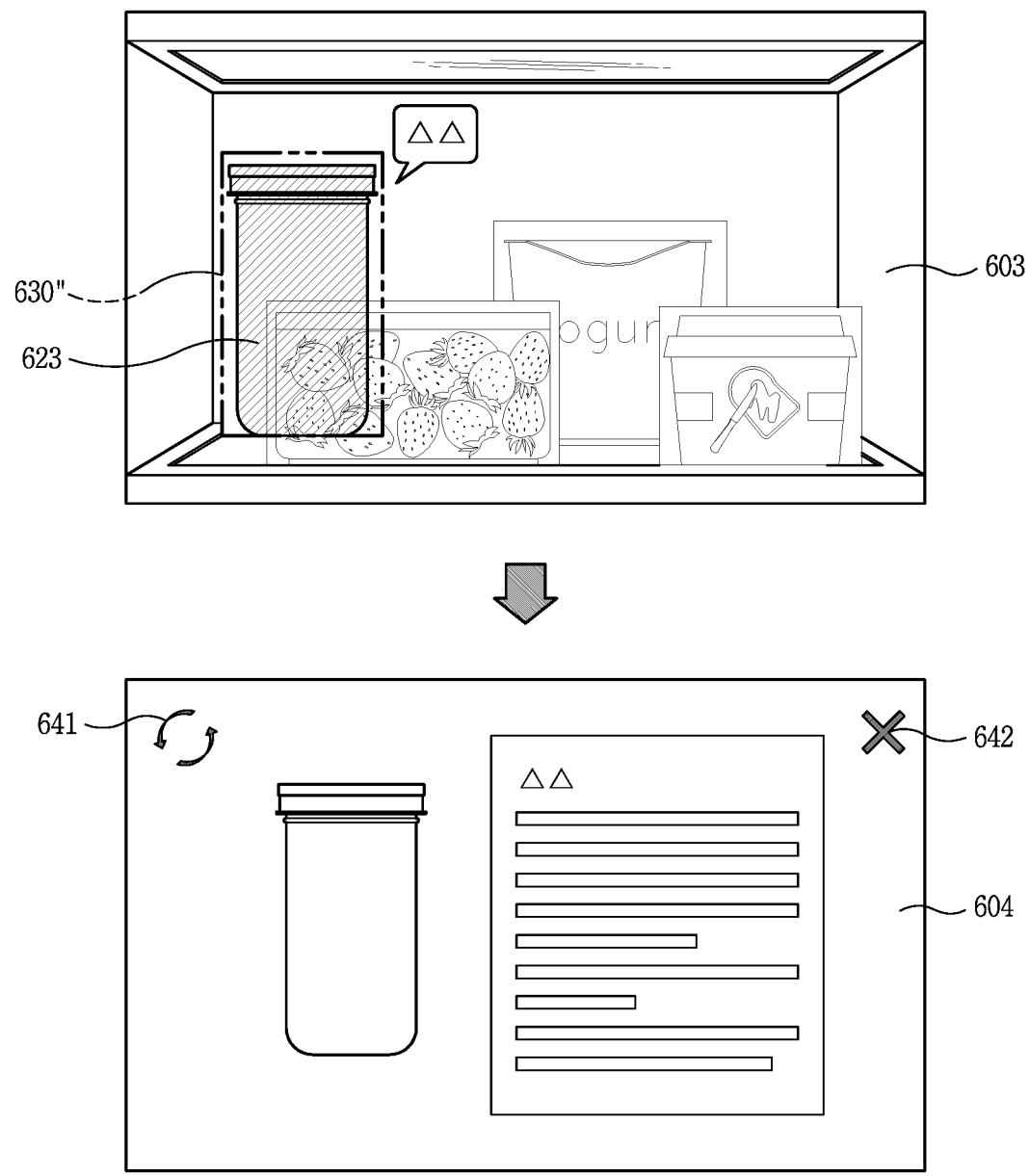

Next, FIGS. 6A, 6B, and 6C show an example method of controlling displaying associated with a partial article image of an article partially hidden by another article or executing an additional function according to an embodiment of the present invention.

First, referring to FIG. 6A, a graphic object 630 is displayed on the border edges of a first article image 621 and a second article image 622 located in front of an article image 601. Also, matching pieces of article information 611 and 612 are displayed inside the article images 621 and 622.

Also, in the article image 601, the graphic object 630 is also displayed on the border edges of a third article image 623 and a fourth article image 624 that are partially hidden by and located in the back of the article images 621 and 622. Also, the pieces of article information matched to the partial article images 623 and 624 may be output in the form of a speech balloon.

Although not shown, when a touch input is applied to the pieces of article information 611, 612, 613, and 614, the article information may be modified through a user input. In this case, the article image history may be updated on the basis of the modified article information.

Also, the third article image 623 and the fourth article image 624 may be displayed as partial article images, but a graphic object indicating an article size matched with reference to the article image history may be displayed on the border edges of the third article image 623 and the fourth article image 624.

To this end, the control unit of the refrigerator may calculate an article size matched to a partial article image on the basis of the stored article image history and may display a graphic object indicating the calculated article size in the vicinity of the partial article image in a displayed second article image. In this case, the displayed graphic object may be overlapped with at least a portion of the article images 621 and 622 and may be formed in a translucent form.

Subsequently, FIG. 6B is an example method of collecting and ascertaining only articles stored in the back of the refrigerator. In FIG. 6A, while article information associated with the partial article images 623 and 624 are displayed as pop-up windows 613 and 614 having the form of a speech balloon, a rear article display request corresponding to a partial article image may be received.

For example, the rear article display request may be generated through a touch input applied to the partial article image or a background image of an article image.

Then, as shown in FIG. 6B, the images 621 and 622 about the articles located in the front of the storage chamber, the articles hiding articles located in the back of the storage chamber, may be switched into, for example, a dotted line form or a translucent form Also, the partial article images 623 and 624 are switched into exposed article images 623' and 624' by inserting the remaining part images of the articles matched to the partial article images and extracted based on the article image history into the graphic object 630. As another example, instead of the remaining part images being inserted, the border edge of the graphic object 630 may be highlighted, and only the images 621 and 622 about the articles located in the front of the storage chamber may be switched into a translucent form.

As another example, referring to FIG. 6C, when the graphic object displayed in the vicinity of the partial article image is touched while an image 602 corresponding to the rear article display request is displayed, the control unit of the refrigerator executes a first function associated with additional information about an article corresponding to a touched region.

Here, the first function refers to a function of displaying detail information about an article.

Also, the detail information may include remaining amount information, a purchase frequency, a use frequency (a put-in/take-out frequency), a purchase time, a purchase place, payment means, and other user-entered information about an article matched to the partial article image.

Also, the detail information may be a multi-view image of the article matched to the partial article image. To this end, a plurality of cameras may be diagonally installed for each compartment in the storage chamber of the refrigerator to generate a multi-view image for the first article image (e.g., a 360-degree image of the article).

As an example of the execution of the first function, referring to FIG. 6C, the image of the graphic object in the vicinity of the partial article image is changed (630"), and a full article image matched to the partial article image is output. Subsequently, the control unit performs switching into a detail information screen 604 for the corresponding article is displayed. An indicator icon 641 capable of ascertaining another angle of the article and an icon 642 for removing the detail information screen 604 may be displayed on the detail information screen 604 together.

Also, as shown in FIG. 6B, when the pop-up windows 613 and 614 in which article information about the partial article image is displayed is touched while the image 602 corresponding to the rear article display request is displayed, the control unit executes a second function associated with a purchase of an article corresponding to a touched region.

Here, the second function may be a function of accessing and executing an online shopping mall to purchase an article online. Therefore, for example, an "instant purchase" button may be generated in a screen corresponding to the execution of the second function.

Next, FIG. 7 is a flowchart illustrating a method of determining the location of an article in a refrigerator article management method according to another embodiment of the present invention.

Referring to FIG. 7, first, a step of detecting the opening of a door of a refrigerator is performed through a door opening/closing detection sensor provided at the door (S701). The door opening/closing detection sensor may be located on a handle side of the door gripped by a user or on one side of the door.

When the opening of the door is detected, the inside of the storage chamber is continuously captured through a camera provided inside a storage chamber to acquire a plurality of article images (S702).

The plurality of article images may be acquired by periodically generating a capture signal through a processor electrically connected to the camera. A control unit of the refrigerator may sequentially recognize a put-in/take-out history by visually recognizing images of articles put in and/or taken out of the refrigerator.

Meanwhile, the capture command may be received through a terminal capable of communicating with the refrigerator as well as through the opening of the refrigerator door. In this case, even when the opening of the refrigerator door is not detected, the capturing of the inside of the storage chamber may be initiated. For example, the capture command may be delivered to the refrigerator by touching a "capture" icon displayed on a touchscreen of the terminal while the terminal communicates with the refrigerator.

Also, according to an embodiment, when a plurality of cameras are provided inside the storage chamber to perform multi-view capturing, the cameras may be sequentially driven in a predetermined order to generate a multi-view image for one article.

Next, when the user closes the door, the closing of the door is detected through the door opening/closing sensor (S703). Then, a capture stop signal is delivered to the camera through the processor.

When the capture is stopped, a stored article is recognized by visually recognizing a plurality of article images acquired after the opening of the door is detected and before the capture is stopped, and also location information and take-out information about the article are acquired (S704).

In detail, it is determined in which of a plurality of storage compartments of the storage chamber a first article is located, and also the location of the first article is determined relative to (e.g. above, below, between, etc.) other articles.

An article image history is generated on the basis of the acquired article information, location information, and take-out information about the article (S705). The process of the refrigerator delivers the generated article image history to a memory of the refrigerator.

As an example, only the last captured article image among the plurality of article images continuously captured may be stored in the article image history. In this case, the other article images captured after the door is opened and before the door is closed are deleted.

In other words, the last article image selected in a first period during which the door is opened and then closed (a first-period article image) and the last article image selected in a second period during which the door is opened and then closed after the first period (a second-period article image) are sequentially stored in the article image history. Subsequently, when a partial article image is detected in a second article image in which an article is partially hidden by another article, the identity of the article is determined using both of the first-period article image and the second-period article image.

Subsequently, when the second article image in which the article is partially hidden by the other article, the control unit of the refrigerator may determine the location of the article matched to the partial article image detected in the second article image on the basis of the article image history (S706).

Next, FIG. 8 shows an example method of displaying article information and providing an associated additional function in a refrigerator article management method according to still another embodiment of the present invention.

Referring to FIG. 8, an input to request an image of the inside of a storage chamber is detected (S801).

Here, the input may be performed in various forms including a touch input applied to a display provided on a door, a predetermined voice command, a knocking on a door, and the like, and there are no limitations on the input scheme.

Even when a user's implicit input is performed instead of a user's explicit input, that is, when a user's proximity to the refrigerator and/or a user's grip/touch to the handle of the door is detected, the input to request the image may be regarded as being received.

When such an input is detected, the latest article image recorded in an article image history is displayed on the display of the door (S802).

In the displayed article image, different graphic objects are displayed for a first article image (a partial article image) in which an article is partially hidden by another article and a second article image (an exposed article image) in which an article is entirely exposed (S803).

For example, a translucent rectangular border edge may be displayed around the partial article image, and a regular border edge may be displayed around the exposed article image. In this case, the translucent rectangular border edge may be displayed to partially overlap with the exposed article image or the border edge of the exposed article image.

When a touch input is applied to any one of the different graphic objects displayed for the partial article image and the exposed article image, an additional function associated with an article matched to an article image to which the touch input is applied is executed (S804).

In detail, when a first touch is applied to the displayed graphic object, a first function associated with additional information about an article corresponding to a touched region may be executed. Also, when a second touch is applied to the displayed graphic object, a second function associated with additional information about an article corresponding to a touched region may be executed.

The aforementioned embodiments of the present invention are not limited to refrigerators and may be applied to commercially available various electronic apparatuses for accommodating, keeping, storing, and managing articles. For example, an embodiment of the present invention may be applied to a clothes washer for washing clothes, a clothes dryer for drying clothes, and a clothes manager for accommodating and managing clothes, etc.

As described above, according to an embodiment of the present invention, it is possible to acquire article information about a stored article by visually recognizing an article image acquired through a camera provided in a storage chamber and also to quickly check the identity of an article located in the back of the storage chamber by managing the acquired article information using an article image history. Thus, it is possible to recognize and display an article matched to a partial article image of the article located in the back of the storage chamber and hidden by another article and article information about the article on the basis of the article image history. Furthermore, by ascertaining a put-in/take-out history of an article stored in or taken out of the storage chamber and a change history of a storage location using images, it is possible to quickly, visually, and easily ascertain a put-in/take-out rank or a storage location of the article.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 250. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A refrigerator comprising:
   a storage chamber configured to store articles;
   a camera configured to capture images of an inside of the storage chamber;
   a memory;
   a display;
   a wireless communication module; and
   a processor configured to:
   obtain, from the camera, a plurality of images of the inside of the storage chamber, wherein each of the plurality of images depict one or more articles located inside the storage chamber;
   transmit, via the wireless communication module, the plurality of images to an artificial intelligence (AI) server;
   receive, via the wireless communication module from the AI server, article information corresponding to each of the articles associated with the plurality of images;
   store, in the memory, an article history comprising the article information and an image corresponding to each of the articles associated with the plurality of images;
   identify, using one or more of the plurality of images, that an article, from among the articles located inside the storage chamber, is partially hidden by one or more other articles located inside the storage chamber;
   identify, based on the article history, which article, from the one or more articles located inside the storage chamber, is the partially hidden article;
   cause the display to display a portion of an image of the partially hidden article relative to displayed other images corresponding to other ones of the articles associated with the plurality of images; and
   cause the display to display the article information corresponding to the partially hidden article at a location that corresponds with a displayed location of the partially hidden article and without obscuring the displayed other images.

2. The refrigerator of claim 1, wherein the processor is further configured to:
   identify the partially hidden article based on the article history and a model learned according to an artificial intelligence algorithm.

3. The refrigerator of claim 1, wherein,
the partially hidden article is identified by comparing an image of the partially hidden article to each of the plurality of images stored in the article image history, and
the article information matched to the partially hidden article is acquired by detecting article information linked to an article image selected based on a result of the comparison in the article image history.

4. The refrigerator of claim 1, wherein,
the processor is further configured to:
obtain, from the camera, a further image of the inside of the storage chamber;
compare the article information stored in the memory with the further image to determine which article has been removed from the storage chamber and determine a location that the removed article has been removed from; and
cause the display to display a graphic image indicating the determined location in the storage chamber of the removed article.

5. The refrigerator of claim 1, wherein the processor is further configured to:
check for change in location inside of the storage location of any of the articles located inside the storage chamber based on the article image history;
based on the change in the location, identifying, based on the article history, which article, from the one or more articles located the inside the storage chamber, is a presently partially hidden article; and
cause the display to display a portion of an image of the presently partially hidden article relative to displayed other images corresponding to other ones of the articles associated with the plurality of images.

6. The refrigerator of claim 1, wherein the processor is further configured to:
calculate an article size of the partially hidden article;
cause the display to display the article information corresponding to the partially hidden article in a pop-up window adjacent to the displayed location of the partially hidden article; and
cause the display to display a graphic object indicating the calculated article size adjacent to the displayed locating of the partially hidden article the partial article image to overlap and overlapping with at least a portion of another article image among the displayed other images.

7. The refrigerator of claim 6, wherein when a rear article display request corresponding to the partially hidden article is received, a remaining part image of the partially hidden article is inserted into the graphic object, and another article image that is partially hiding the partially hidden article is displayed in a translucent form.

8. The refrigerator of claim 6, wherein the processor is further configured to:
execute a first function associated with additional information about an article corresponding to a touched region, based on a touch being applied to the displayed graphic object; and
execute a second function associated with a purchase of an article according to a touched region, based on a touch being applied to the displayed pop-up window.

9. The refrigerator of claim 1, further comprising a door opening/closing detection sensor configured to detect opening or closing of a refrigerator door, wherein,
when the opening of the refrigerator door is detected through the door opening/closing detection sensor, the processor outputs a driving signal to the camera to cause the camera to repeatedly capture images;
when the closing of the refrigerator door is detected through the door opening/closing detection sensor, the processor outputs a driving stop signal to the camera, and
visually recognizes a plurality of continuously captured article images, acquires take-out information and location information about a corresponding article, and generates the article image history on the basis of the acquired information.

10. The refrigerator of claim 9, wherein a last captured image among the plurality of repeatedly captured article images is stored in the article history.

11. The refrigerator of claim 1, wherein the wireless communication module comprises at least one of a Wi-Fi module, a Zigbee module, or a local area network access module.

12. A method of managing articles in a refrigerator having a display and a memory, the method comprising:
obtaining, via a camera, a plurality of images of an inside of a storage chamber of the refrigerator, wherein each of the plurality of images depict one or more articles located inside the storage chamber;
storing, in the memory, an article history comprising article information and an image corresponding to each of the articles associated with the plurality of images;
identifying, using one or more of the plurality of images, that an article, from among the articles located inside the storage chamber, is partially hidden by one or more other articles located inside the storage chamber;
identifying, based on the article history, which article, from the one or more articles located inside the storage chamber, is the partially hidden article;
displaying, on the display, a portion of an image of the partially hidden article relative to displayed other images corresponding to other ones of the articles associated with the plurality of images;
displaying, on the display, the article information corresponding to the partially hidden article at a location that corresponds with a displayed location of the partially hidden article and without obscuring the displayed other images;
displaying, on the display, a first image of an article associated with an image stored in the memory, based on a request; and
displaying, on the display, first article information associated with the article of the first image is visually distinguished from the article information corresponding to the partially hidden article,
wherein each of the first article information and the article information corresponding to the partially hidden article include an article name and expiration date information.

13. A refrigerator comprising:
a storage chamber configured to store articles;
a camera configured to capture images of an inside of the storage chamber;
a memory;
a display;
a processor configured to:
obtain, from the camera, a plurality of images of the inside of the storage chamber, wherein each of the plurality of images depict one or more articles located inside the storage chamber;

store, in the memory, an article history comprising article information and an image corresponding to each of the articles associated with the plurality of images;
identify, using one or more of the plurality of images, that an article, from among the articles located inside the storage chamber, is partially hidden by one or more other articles located inside the storage chamber;
identify, based on the article history, which article, from the one or more articles located inside the storage chamber, is the partially hidden article;
cause the display to display a portion of an image of the partially hidden article relative to displayed other images corresponding to other ones of the articles associated with the plurality of images;
calculate an article size of the partially hidden article;
cause the display to display the article information corresponding to the partially hidden article in a pop-up window adjacent to the displayed location of the partially hidden article and without obscuring the displayed other images; and
cause the display to display a graphic object indicating the calculated article size adjacent to the displayed location of the partially hidden article and overlapping with at least a portion of another article image among the displayed other images.

* * * * *